US008204019B2

(12) United States Patent
Himmanen et al.

(10) Patent No.: US 8,204,019 B2
(45) Date of Patent: Jun. 19, 2012

(54) METHOD AND SYSTEM TO ENABLE SIMULTANEOUS RECEPTION OF PLURALITY OF SERVICES IN DVB SYSTEMS

(75) Inventors: Heidi Himmanen, Turku (FI); Harri J. Pekonen, Raisio (FI); Jani Väre, Kaarina (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 12/205,800

(22) Filed: Sep. 5, 2008

(65) Prior Publication Data

US 2009/0067384 A1 Mar. 12, 2009

Related U.S. Application Data

(60) Provisional application No. 60/970,197, filed on Sep. 5, 2007.

(51) Int. Cl.
*H04W 72/04* (2009.01)

(52) U.S. Cl. ......................... 370/330; 370/478; 370/436

(58) Field of Classification Search .................. 370/330, 370/478, 485, 486, 436
See application file for complete search history.

(56) References Cited

U.S. PATENT DOCUMENTS

| | | | | |
|---|---|---|---|---|
| 5,850,390 | A | 12/1998 | Ramel | |
| 2008/0013599 | A1 * | 1/2008 | Malladi | 375/132 |
| 2008/0055070 | A1 * | 3/2008 | Bange et al. | 340/539.12 |
| 2008/0056390 | A1 * | 3/2008 | Rainbolt et al. | 375/260 |
| 2008/0273609 | A1 * | 11/2008 | Murakami et al. | 375/260 |
| 2009/0010238 | A1 * | 1/2009 | Barak et al. | 370/342 |
| 2009/0074086 | A1 * | 3/2009 | Murakami et al. | 375/260 |

FOREIGN PATENT DOCUMENTS

| | | | |
|---|---|---|---|
| EP | 0 838 915 | A | 4/1998 |
| EP | 0 854 600 | A | 7/1998 |

OTHER PUBLICATIONS

International Search Report for PCT Application No. PCT/IB2008/053458 dated May 27, 2009.
European Office Action for European Patent Application No. 08807462.0, dated Dec. 14, 2010.

* cited by examiner

*Primary Examiner* — Brian Nguyen
(74) *Attorney, Agent, or Firm* — Banner & Witcoff

(57) ABSTRACT

A method comprises dividing a time frequency frame into a plurality of slots, the frame having one or more radio-frequency (RF) channels, determining a maximum slot length, and scheduling service data in symbols such that all service data symbols are within the maximum slot length of symbols corresponding to at least one common service part.

19 Claims, 10 Drawing Sheets

310

300

| | RF1 | RF2 |
|---|---|---|
| Common service part | 30 | 15 |
| | 29 | 14 |
| | 28 | 13 |
| | 27 | 12 |
| | 26 | 11 |
| | 25 | 10 |
| | 24 | 9 |
| | 23 | 8 |
| | 22 | 7 |
| | 21 | 6 |
| Common service part | 20 | 5 |
| | 19 | 4 |
| | 18 | 3 |
| | 17 | 2 |
| | 16 | 1 |
| | 15 | 30 |
| | 14 | 29 |
| | 13 | 28 |
| | 12 | 27 |
| | 11 | 26 |
| Common service part | 10 | 25 |
| | 9 | 24 |
| | 8 | 23 |
| | 7 | 22 |
| | 6 | 21 |
| | 5 | 20 |
| | 4 | 19 |
| | 3 | 18 |
| | 2 | 17 |
| | 1 | 16 |

Figure 3

| RF1 | RF2 | RF3 | RF4 |
|---|---|---|---|
| 28 | 21 | 14 | 7 |
| 27 | 20 | 13 | 6 |
| 26 | 19 | 12 | 5 |
| 25 | 18 | 11 | 4 |
| 24 | 17 | 10 | 3 |
| 23 | 16 | 9 | 2 |
| 22 | 15 | 8 | 1 |
| 21 | 14 | 7 | 28 |
| 20 | 13 | 6 | 27 |
| 19 | 12 | 5 | 26 |
| 18 | 11 | 4 | 25 |
| 17 | 10 | 3 | 24 |
| 16 | 9 | 2 | 23 |
| 15 | 8 | 1 | 22 |
| 14 | 7 | 28 | 21 |
| 13 | 6 | 27 | 20 |
| 12 | 5 | 26 | 19 |
| 11 | 4 | 25 | 18 |
| 10 | 3 | 24 | 17 |
| 9 | 2 | 23 | 16 |
| 8 | 1 | 22 | 15 |
| 7 | 28 | 21 | 14 |
| 6 | 27 | 20 | 13 |
| 5 | 26 | 19 | 12 |
| 4 | 25 | 18 | 11 |
| 3 | 24 | 17 | 10 |
| 2 | 23 | 16 | 9 |
| 1 | 22 | 15 | 8 |

Figure 5

| RF1 | RF2 | RF3 | RF4 |
|---|---|---|---|
| 36 | 27 | 18 | 9 |
| 35 | 26 | 17 | 8 |
| 34 | 25 | 16 | 7 |
| 33 | 24 | 15 | 6 |
| 32 | 23 | 14 | 5 |
| 31 | 22 | 13 | 4 |
| 30 | 21 | 12 | 3 |
| 29 | 20 | 11 | 2 |
| 28 | 19 | 10 | 1 |
| 27 | 18 | 9 | 36 |
| 26 | 17 | 8 | 35 |
| 25 | 16 | 7 | 34 |
| 24 | 15 | 6 | 33 |
| 23 | 14 | 5 | 32 |
| 22 | 13 | 4 | 31 |
| 21 | 12 | 3 | 30 |
| 20 | 11 | 2 | 29 |
| 19 | 10 | 1 | 28 |
| 18 | 9 | 36 | 27 |
| 17 | 8 | 35 | 26 |
| 16 | 7 | 34 | 25 |
| 15 | 6 | 33 | 24 |
| 14 | 5 | 32 | 23 |
| 13 | 4 | 31 | 22 |
| 12 | 3 | 30 | 21 |
| 11 | 2 | 29 | 20 |
| 10 | 1 | 28 | 19 |
| 9 | 36 | 27 | 18 |
| 8 | 35 | 26 | 17 |
| 7 | 34 | 25 | 16 |
| 6 | 33 | 24 | 15 |
| 5 | 32 | 23 | 14 |
| 4 | 31 | 22 | 13 |
| 3 | 30 | 21 | 12 |
| 2 | 29 | 20 | 11 |
| 1 | 28 | 19 | 10 |

Figure 6

METHOD AND SYSTEM TO ENABLE SIMULTANEOUS RECEPTION OF PLURALITY OF SERVICES IN DVB SYSTEMS

BACKGROUND OF THE INVENTION

The present invention relates generally to the transferring of data in a transmission system. More particularly, the present invention relates to the use of time-frequency (TF) slicing for use in transmitting data in a data transmission system.

High-definition television (HDTV) services generally require higher bit rates than conventional standard definition television (SDTV) services. Proposed digital video broadcasting standardization seeks to design the physical layer of new terrestrial system for broadcasting of HDTV services. Time-Frequency (TF) slicing is one candidate to the baseline of such standardization work due to its property of providing high statistical multiplexing gain compared to single radio-frequency (RF) channel multiplexes, where a lot of capacity would be wasted, when transmitting high bit rate (e.g., 4-16 Mbps) services. Due to regulatory constraints, it is not possible to increase the bandwidth of one RF channel. TF slicing solves the problem by combining several RF channels into one multiplex.

However, receivers for such broadcast should have only one tuner to receive all parts of a service which requires intelligent scheduling of the services transmitted over many radio channels. In current digital TV systems many TV channels might share a service part, e.g. teletext or Multimedia Home Platform (MHP). With TF-slicing scheduling of the service parts becomes a problem, if simultaneous reception of e.g. a TV service and a common service part with one tuner should be enabled.

SUMMARY OF THE INVENTION

One aspect of the invention relates to a method comprising dividing a time frequency frame into a plurality of slots, the frame having one or more radio-frequency (RF) channels, determining a maximum slot length, and scheduling service data in symbols such that all service data symbols are within the maximum slot length of symbols corresponding to at least one common service part.

In one embodiment, the plurality of slots comprises one slot for each radio-frequency channel in the time frequency frame.

In one embodiment a number of slots in one or more RF channels is allocated to a service so that the slots on the one or more RF channels do not overlap with each other in time but are shifted with regard to each other with an amount that depends on the time frequency frame length and the number of allocated RF channels. In one embodiment the shift is the time frequency frame length (TF_frame_length) divided by the number ($N_{RF}$) of allocated RF channels, or:

$$\text{shift} = \frac{\text{TF\_frame\_length}}{N_{RF}},$$

wherein $N_{RF}$ is the number of radio frequency channels in the frame. The maximum slot length is dependant on the shift defined above and on the maximum tuning time for a receiver when changing radio frequency channels. In one embodiment, the maximum slot length (max_slot_length) equals the shift, as defined above, less the maximum tuning time ($T_{tuning}$). The maximum tuning time may include any turn-on delays of the tuner or receiver and/or other processing start-up time.

In one embodiment, the scheduling makes available multiple common service parts through hopping between radio-frequency channels.

In another aspect of the invention, an apparatus comprises a processor and a memory unit communicatively connected to the processor. The memory unit includes computer code for dividing a time frequency frame into a plurality of slots, the frame having one or more radio-frequency channels, computer code for determining a maximum slot length, and computer code for scheduling service data in symbols such that all service data symbols are within the maximum slot length of symbols corresponding to at least one common service part.

In another aspect of the invention, an apparatus comprises means for dividing a time frequency frame into a plurality of slots, the frame having one or more radio-frequency channels, means for determining a maximum slot length, and means for scheduling service data in symbols such that all service data symbols are within the maximum slot length of symbols corresponding to at least one common service part.

BRIEF DESCRIPTION OF THE DRAWINGS

FIG. 3 is an illustration of an exemplary frame with two RF channels according to an embodiment of the present invention;

FIG. 5 is an illustration of an exemplary frame with allocation of services with auxiliary services according to an embodiment of the present invention;

FIG. 6 is an illustration of an exemplary frame with allocation of services and auxiliary services according to an embodiment of the present invention;

DETAILED DESCRIPTION OF THE PREFERRED EMBODIMENTS

Various embodiments provide a system and method for scheduling of services for multiplexes covering one or more radio-frequency (RF) channels. Scheduling of service parts common to several services, such as auxiliary services like teletext or Multimedia Home Platform (MHP), enables reception with one tuner. Embodiments of the invention may be implemented for time-frequency slicing in proposed Digital Video Broadcasting systems, for example, and may be generalized as optimization of multi-frequency transmission for single tuner receivers.

Figure 1:
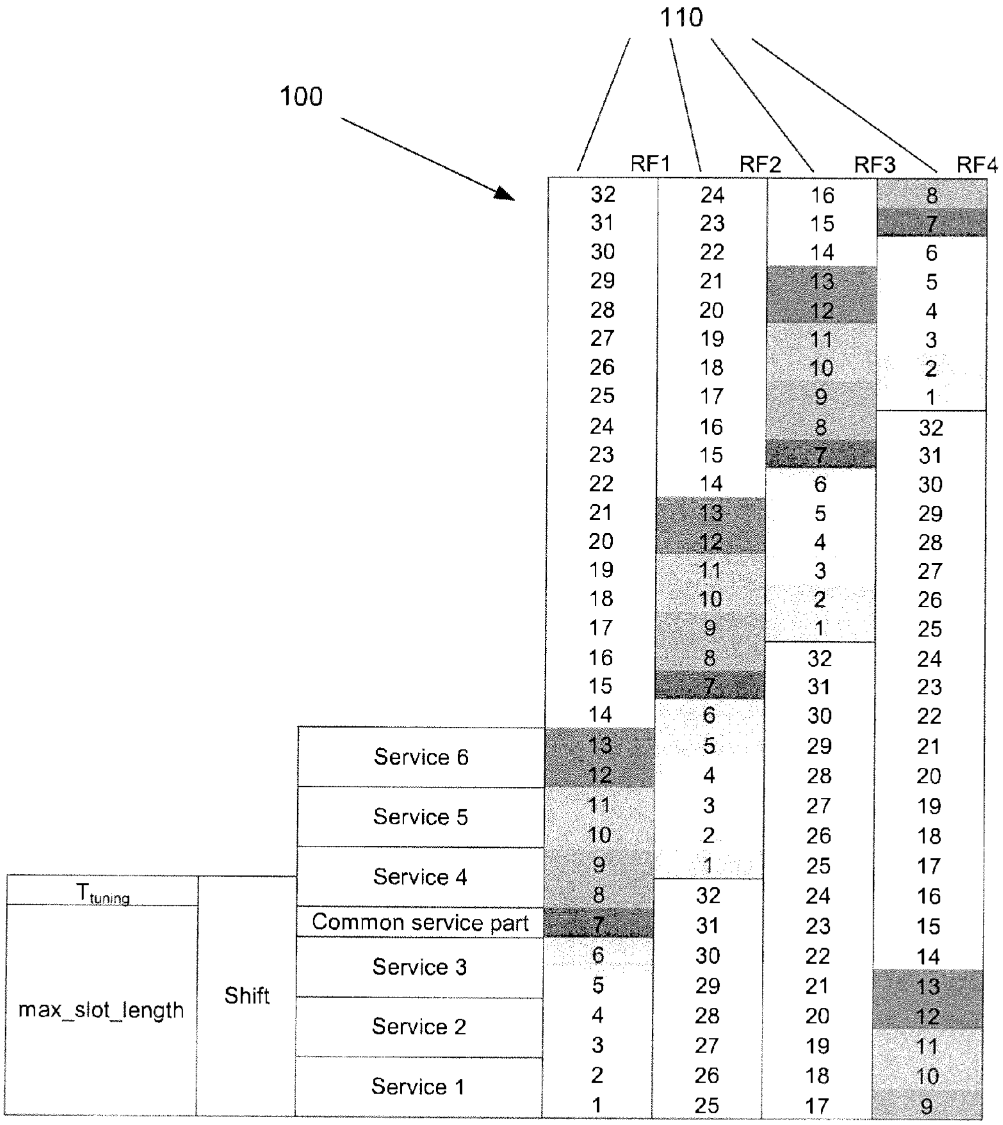
FIG. 1 is an illustration of an exemplary frame with allocation of services according to an embodiment of the present invention.

FIG. 1 shows a TF frame 100 where four RF channels ($N_{RF}$=4) and thirty-two physical channels (slots) are included in one exemplary embodiment. As shown in FIG. 1, the TF frame 100 includes four frames 110, one for each RF channel (identified as RF1, RF2, RF3 and RF4). Each physical channel typically includes one slot in every RF channel during the TF frame 100. There must be a time shift between the slots of a certain physical channel in different RF channels. This makes it possible to use receivers with one tuner, because the receiver then has time to tune to the new frequency before receiving the next slot. The number of RF channels can be $N_{RF}$=2, 3, 4, 5, 6 or even more in various embodiments. The used RF channels do not need to be adjacent to each other.

FIG. 1 illustrates an exemplary frame with allocation of services according to an embodiment of the present invention. FIG. 1 demonstrates how the slots can be allocated to enable reception with a single tuner. The frame 100 includes the RF channels (RF1-RF4) 110 which are depicted by the four rightmost columns. The remainder of the columns illustrated in FIG. 1 are illustrated solely for purposes of understanding the nature of the invention and are not part of the TF frame 100.

The services are allocated symbols in the frame. For example, the six services illustrated in FIG. 1 are allocated as follows: service 1 is allocated symbols 1-2, service 2 is allocated symbols 3-4, etc. The RF channels are shifted by an amount depending on the TF frame length and on the number of RF channels, in one embodiment, in accordance with:

$$\text{shift} = \frac{\text{TF\_frame\_length}}{N_{RF}}$$

where TF_frame_length describes the length of the TF frame in orthogonal frequency division multiplexing (OFDM) symbols. In the embodiment illustrated in FIG. 1, TF_frame_length=32. Further, the frame of the embodiment of FIG. 1 includes four RF channels. Thus, $N_{RF}$=4 in FIG. 1. Using these parameters, the shift is calculated as shift=8.

The frame is associated with a maximum slot length which relates to describing the largest amount of OFDM symbols that can be allocated to one service. The maximum slot length is dependant on the slot length, the maximum tuning time and other turn-on delays of the receiver and/or signal processing parts and, in one embodiment, may be expressed as:

$$\text{max\_slot\_length} = \text{shift} - T_{tuning}$$

where $T_{tuning}$ is the maximum tuning time for a receiver when changing radio frequency channels. In the embodiment illustrated in FIG. 1, the maximum length for the slot is seven symbols with a maximum tuning time of one symbol.

In accordance with embodiments of the present invention, a logical group of physical layer pipes (PLPs) may comprise Services 1-3 and a common service part. In accordance with embodiments of the present invention, scheduling of the service group and its common service part is beneficially achieved.

In the embodiment of FIG. 1, a service group may be defined by services 1-6. When the scheduling is done so that all the services of the service group are at a distance less than or equal to the maximum slot length from the common part, the common service part can be received simultaneously with all services 1-6. It is possible to simultaneously receive all services transmitted during the maximum slot length, e.g. symbols 1-7, symbols 7-13, etc.

The common service part may be, for example, teletext or MHP services. Further the common service part may also include Program Specific Information/Service Information (PSI/SI) data of the DVB system or other data applicable for similar purposes. In current Digital Video Broadcasting-Terrestrial (DVB-T) systems simultaneous reception of the video and audio parts with teletext services is possible. In TF slicing for DVB-T2 this invention enables the same without retransmission of teletext in every group of PLPs.

Figure 2:
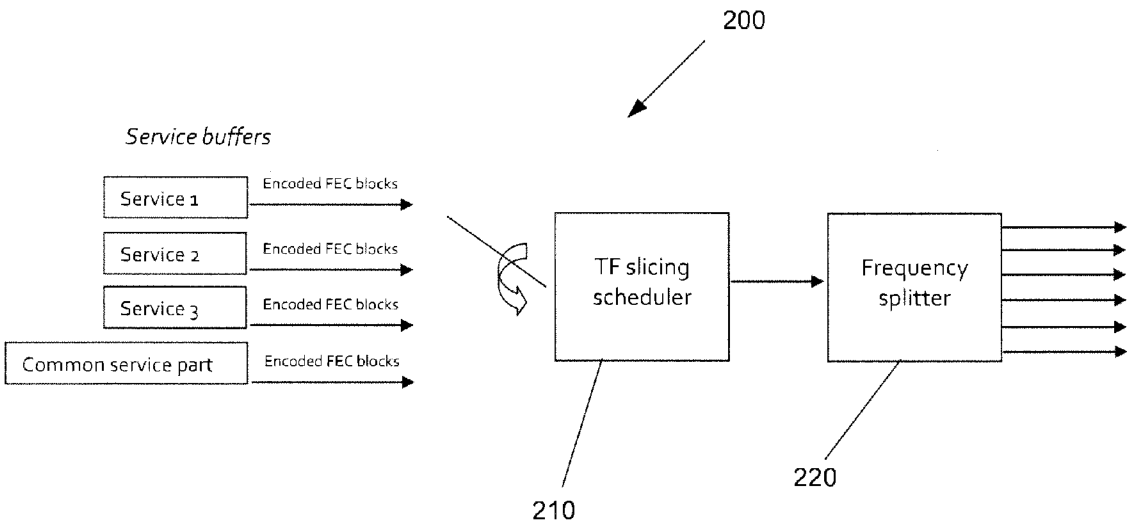
FIG. 2 illustrates an exemplary block diagram of a transmitter according to an embodiment of the present invention.

Referring now to FIG. 2, a functional block diagram of an exemplary network end, such as a transmitter, according to embodiments of the present invention is illustrated. The transmitter 200 includes a TF slicing scheduler 210 adapted to receive data related to one or more services and to one or more common service parts. The scheduled data is transferred from the TF slicing scheduler to a frequency splitter 220. The TF slicing scheduler 210 is adapted to implement any scheduling rules associated with the service data. The rules about the slot allocation for the services should be applied by the scheduler. The network operator may program the rules for which services are connected to which common service. The scheduler 210 allocates the service slots based on the amount of data in the service buffers and the rules for which symbols can carry common service parts to enable reception with a single tuner. The scheduler also creates the dynamic signalling data for finding the service slots.

Figure 7:
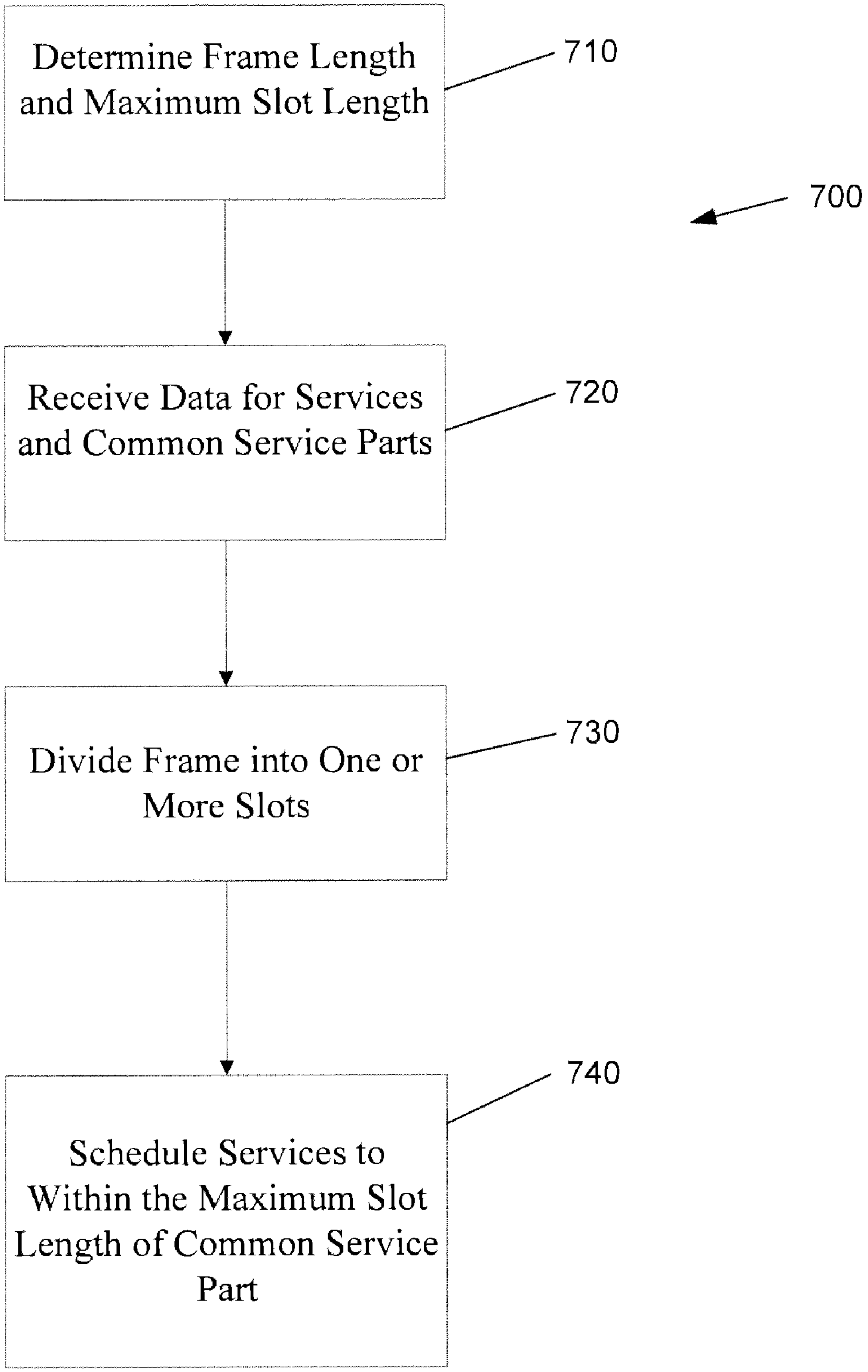
FIG. 7 is a flow chart illustrating an exemplary operation of a TF slicing scheduler according to an embodiment of the present invention.

One embodiment of the operation of the scheduler 210 is illustrated in FIG. 7. In the scheduling process 700, the scheduler 210 determines the frame length and maximum slot length value for the particular implementation (block 710). Data for the services and the common service parts is then received (block 720). The frame is then divided in to one or more slots (block 730). Each slot may be associated with one or more symbols. The scheduler 210 then schedules services such that the services are within the maximum slot length of the common service part (block 740).

Referring now to FIG. 3, by further arranging the common service parts and service slot allocations, it is possible to provide many different common service parts. FIG. 3 illustrates an embodiment of a frame 300 with two RF channels 310. The frame 300 is divided into thirty slots (1-30) which may carry data that may comprise one or more OFDM symbols. As used herein, the words 'symbol' and 'slot' may be interchangeably used. In the embodiment illustrated in FIG. 3, the allocation actually allows a receiver to receive at least two common service parts. When receiving the services transmitted in symbols 1-3, 7-13, 17-23 or 27-30, it is possible to receive all common service parts. The common service parts are the shaded slots 10, 20 and 30. When the tuner is tuned to another RF channel it is necessary to have a tuning time $T_{tuning}$ between receiving transmissions from different RF channels. In this illustrative example the tuning time has been taken as having duration of one slot. The tuning time can vary dependent of the tuner implementation and the transmission parameters from one to several OFDM symbols. In addition, it is possible to receive all common service parts simultaneously with large groups of services transmitted in symbols 7-13, 17-23 or 27-3.

During reception of services carried in symbols 4-6, 14-16 or 24-26, it is possible to receive only two of the auxiliary services carried in symbols 10, 20 and 30 as the tuner cannot be tuned instantly from one RF channel to another and it is not possible to receive two RF channels simultaneously. In embodiments of the invention, an "auxiliary service mode" may be introduced in which reception of all auxiliary services simultaneously is possible with one tuner. In this regard, a user may browse all teletext services of all TV channels at the same time.

In order to enable reception of at least one common service part for each service, at least $N_{RF}$−1 common service parts are needed. Then, if all common service parts on one RF channel are copies of the first, the same common service can be provided to the whole multiplex. The allocation of the service parts is dependent on the length of the common service slots in relation to the frame length and $T_{tuning}$.

It should be noted that the figures here are presented with a granularity of OFDM symbols only for simplicity and for demonstration purposes. In TF slicing, the sizes of the service slots are not in connection to OFDM symbols but to the OFDM cells, or active data carriers inside an OFDM symbol. For example if using the DVB-T pilot pattern the amount of active carriers is 6048 in each data symbol for FFT size 8K. The granularity of the tuning time ($T_{tuning}$) is, however, in OFDM symbols. For example a tuning time of 5 ms corresponds to about 5 OFDM symbols with FFT size 8K and guard interval ⅛, as one ODFM symbol duration including guard interval is $$\left(1+\frac{1}{8}\right)*896\ \mu s = 1\ \text{ms (symbol duration} = 896\ \mu s\ \text{for } 8K).$$

If trying to achieve a frame duration of around 200 ms in 8K mode, good choices for TF_frame_length would be 198 OFDM symbols for $N_{RF}$=6(198/6=33), 196 for $N_{RF}$=4(196/4=49), etc. Some OFDM symbols have to be reserved for signalling between the TF frames.

Figure 4:
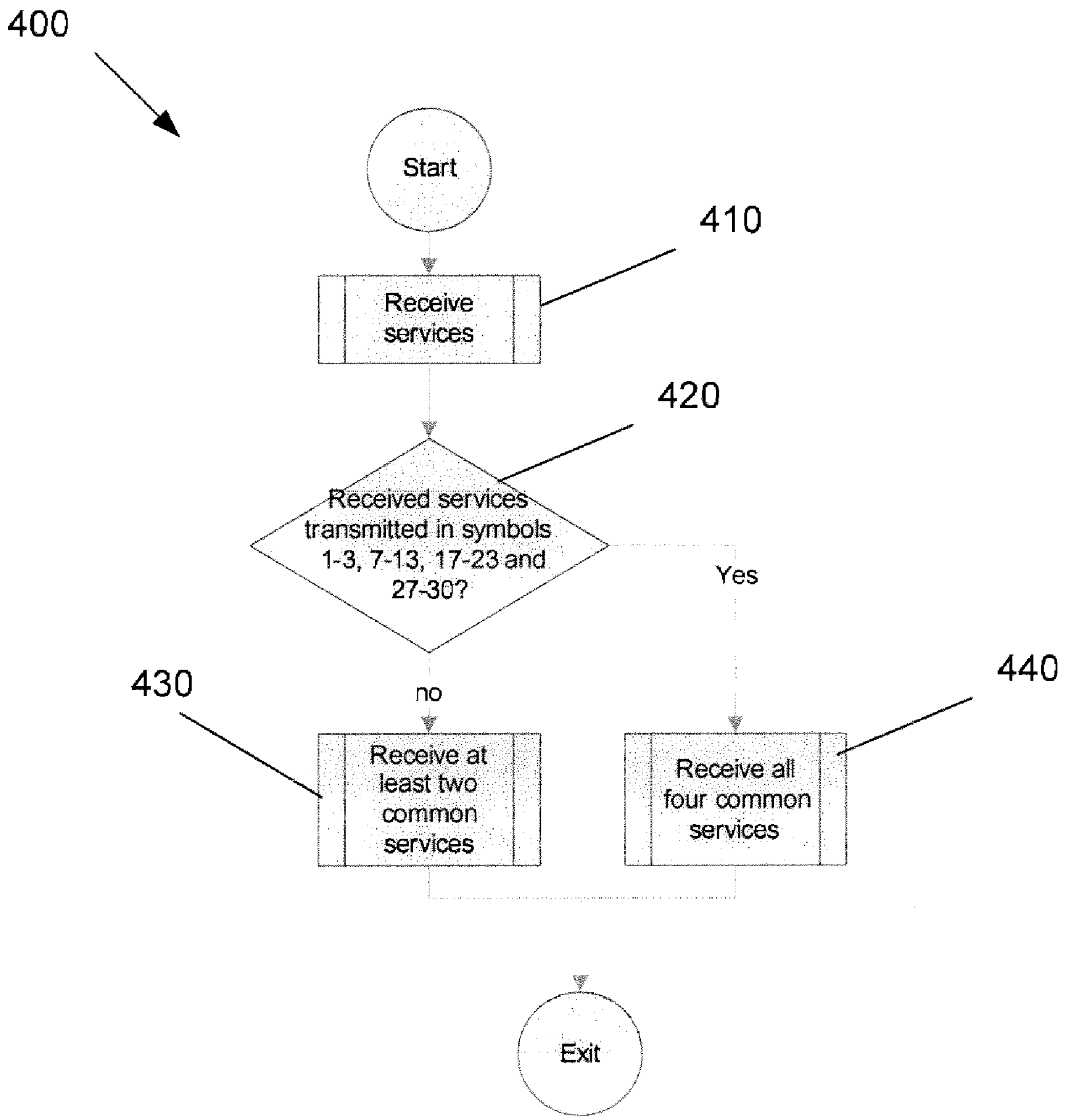
FIG. 4 is an exemplary flow chart illustrating the operation of a receiver with scheduling illustrated in FIG. 2 according to an embodiment of the present invention.

Referring now to FIG. 4, an example of the generic receiver implementation accordingly to the scheduling described in FIGS. 2 and 3 is illustrated. In accordance with the embodiments of the invention, the data related to the services is first received (block 410). At block 420, a determination is made as to the slots in which the received data belonged. For example, in the illustrated embodiment of FIGS. 3 and 4, the determination is made as to whether the received data belonged to symbols 1-3, 7-13, 17-23 or 37-30. If the data did not belong to certain slots, at least two of the common service parts are received (block 430). On the other hand, if the data belonged to certain slots, all common service parts are received (block 440).

Referring now to FIG. 5, an exemplary frame with four RF channels with allocation of services with auxiliary services according to an embodiment of the present invention is illustrated. The embodiment of FIG. 5 illustrates at least one auxiliary service is provided for all services. The auxiliary service data is illustrated in FIG. 5 as the shaded cells 6, 16 and 25. By arranging the common service parts to have time for tuning between all slots on all channels, the auxiliary mode is also enabled. Also, the tuning time is assumed as having duration of one slot and the slot comprises one or more OFDM symbols as disclosed previously.

If the signaling information (e.g., of type PSI/SI) or a part of it would be transmitted in its own PLP, it may be arranged in accordance with the embodiment of FIG. 5. In one embodiment, only one slot per RF per frame is allocated for signaling. For example, if three common service parts are required to service the whole multiplex, as in the embodiment of FIG. 5, the common service part in symbol 6 would be transmitted in TF frame number 1, common service part in symbol 16 would be transmitted in TF frame number 2, common service part in symbol 25 would be transmitted in TF frame number 3, common service part in symbol 6 would be transmitted in TF frame number 4, etc. This way the PSI/SI can reach all services in the multiplex but does not require more capacity than necessary.

In various embodiments, the signaling information may be sent as part of other common service part or in its own dedicated PLP.

By allocating signaling information (e.g., PSI/SI) its own PLP, better time and frequency diversity can be provided to the signaling information.

The TF frames may have more than one signaling PLP. For example, in the embodiment of FIG. 3, three signaling PLPs may be provided, wherein all services can access PLP from every TF frame.

In one embodiment, the signaling PLPs may be present only in some TF frames, for example, so that the signaling PLP is in TF frame number 1 in symbol 10, in TF frame number 2 in symbol 20, in TF frame 3 in symbol 30, and in TF frame number 4 again in symbol 10. Other types of scattering the signaling PLPs to TF frames are also possible and contemplated within the scope of the present invention.

Referring now to FIG. 6, an example of allocation of common service parts to enable reception of at least two auxiliary services on four RF channels is illustrated. With $N_{RF}$ or $N_{RF}$+1 hops during one frame, when receiving services allocated in slots 1-7 it is possible to receive only one common service part in symbols 36 or 8. When receiving any other services, in slots 8-36, reception of two common service parts simultaneously is possible. If allowing more hops during the reception of one frame, also the services transmitted in symbols 1-7 can receive two common service parts. For example, when receiving services in symbols 4-9, it is possible to receive symbol 29 and when receiving services in symbols 1-3 (actually 35-3), it is possible to receive symbol 15 simultaneously. It should be noted that with this scheduling, the auxiliary mode is not enabled, as simultaneous reception of symbols 8 and 36 is not possible.

Figure 8:
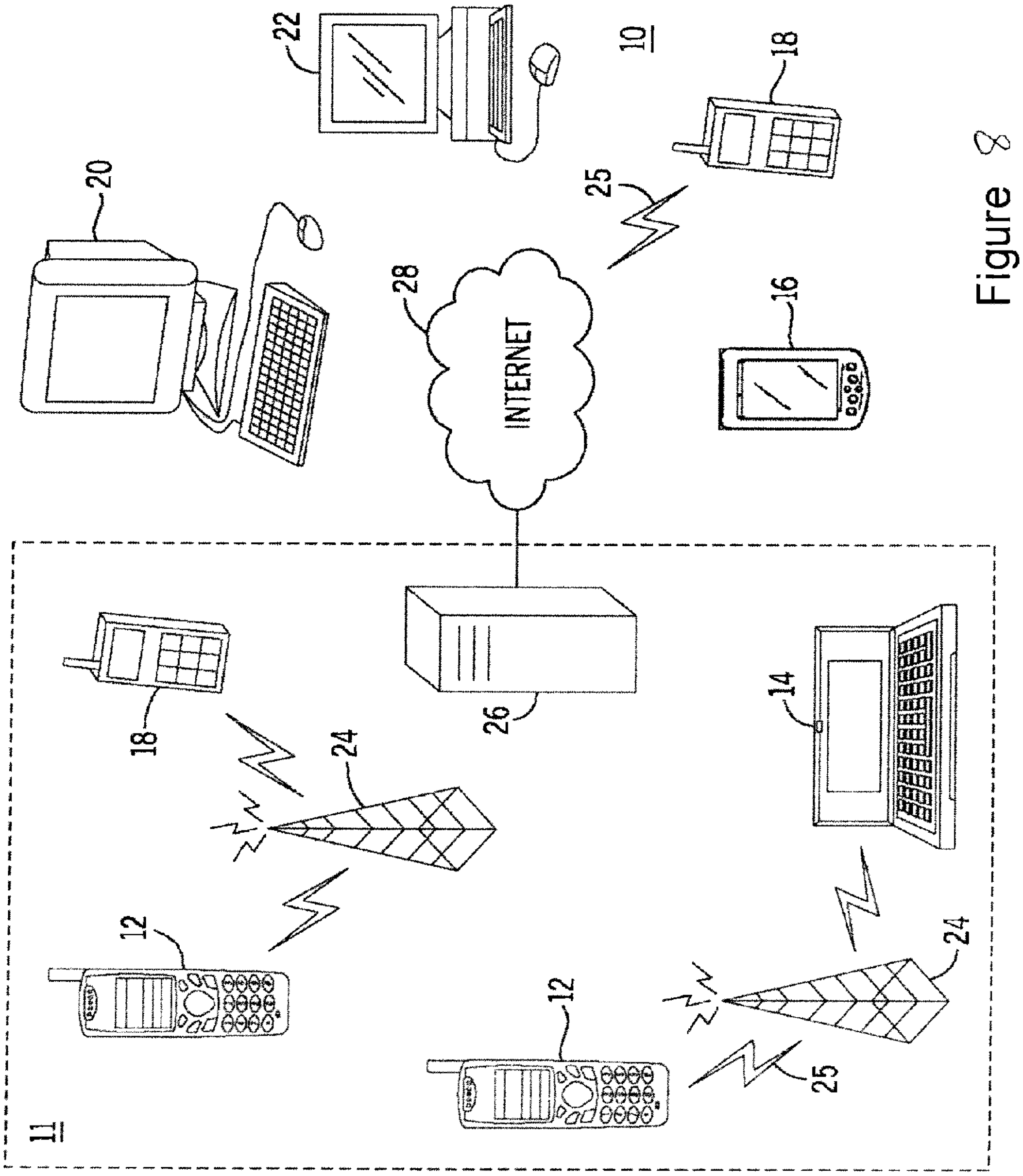
FIG. 8 is an overview diagram of a system within which various embodiments of the present invention may be implemented.

FIG. 8 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 8 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like. The exemplary communication devices of the system 10 may include, but are not limited to, a mobile device 12, a combination PDA and mobile telephone 14, a PDA 16, an integrated messaging device (IMD) 18, a desktop computer 20, and a notebook computer 22. Such devices can be utilize OBEX to exchange binary data as described above. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 9:
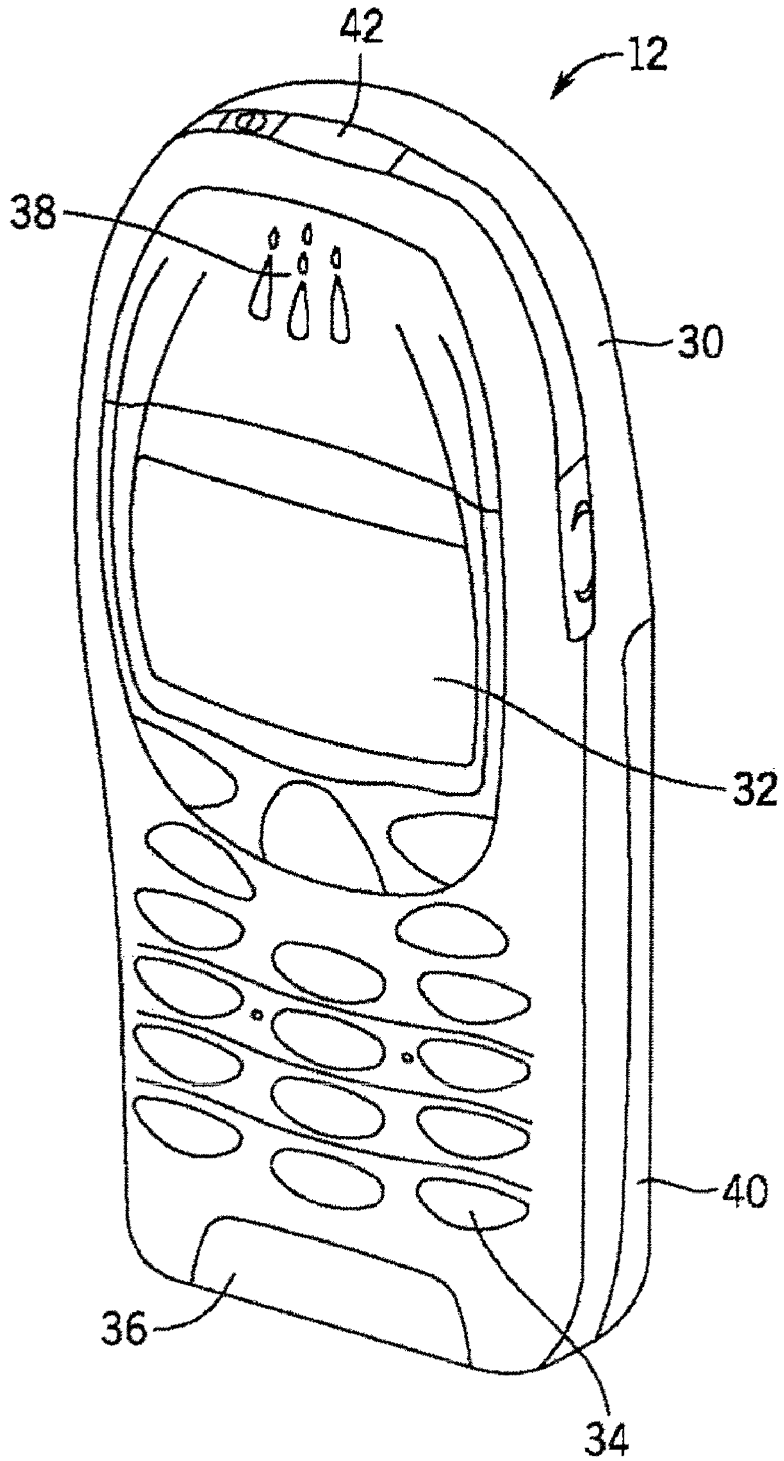
FIG. 9 is a perspective view of an electronic device that can be used in conjunction with the implementation of various embodiments of the present invention.
Figure 10:
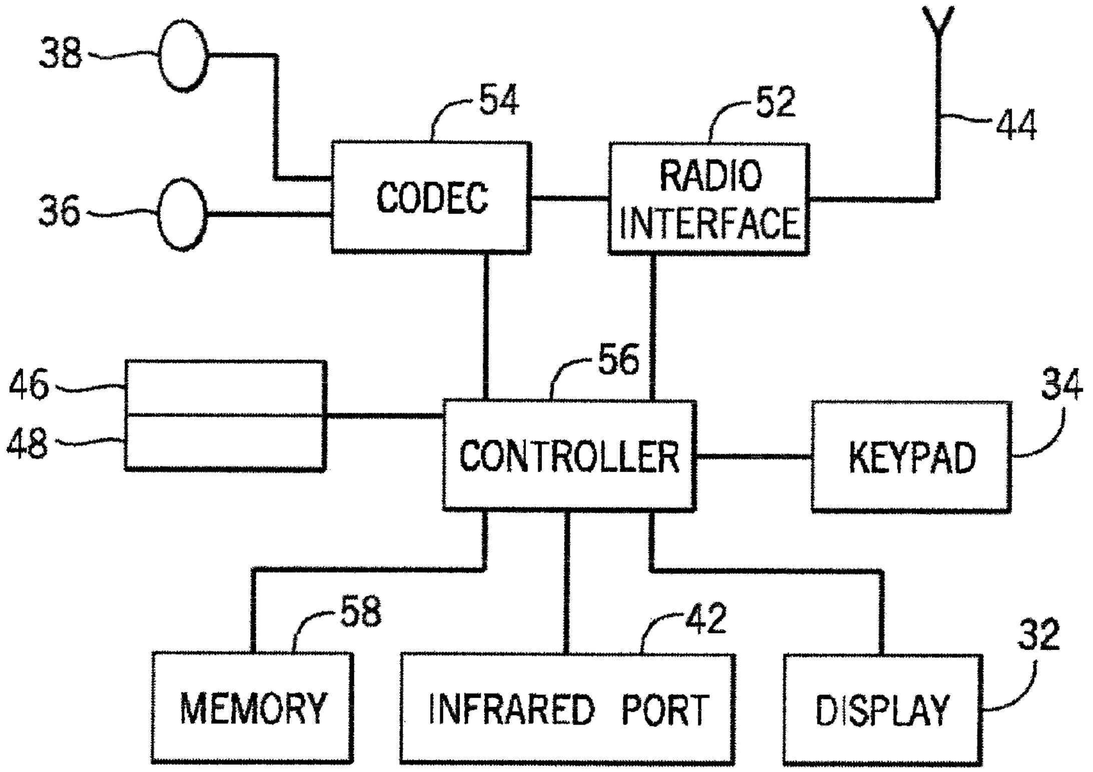
FIG. 10 is a schematic representation of the circuitry which may be included in the electronic device of FIG. 9.

FIGS. 9 and 10 show one representative mobile device 12 within which the present invention may be implemented. It should be understood, however, that the present invention is not intended to be limited to one particular type of electronic device. The mobile device 12 of FIGS. 9 and 10 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The invention enables single tuner reception of auxiliary services or common service parts for a large amount of Time-Frequency sliced service. In conventional DVB-T systems in Finland, some five SDTV services have the same teletext and MHP service (YLE, Mux A; YLE is the Finnish Broadcasting company comparable to e.g. CNN, ABC etc. and Mux A means one service multiplex carrying a number of ‘TV channels’). Due to this invention, the same is achievable for at least five HDTV channels with common auxiliary services (depending on other transmission parameters) in a DVB-T2 system, without any need of retransmission.

It is possible to arrange the auxiliary service slots so that reception of all auxiliary services is enabled with one tuner, which is not possible in current DVB-T systems, where different auxiliary services are located in different multiplexes on different RF channels.

The invention enables e.g. creation of ‘up-to-date’ and ‘complete’ teletext view on the receiver with single tuner while simultaneously other services can be consumed.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words “component” and “module,” as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:

dividing, by a processor, a time frequency flame into a plurality of slots, the flame having one or more radio-frequency (RF) channels;

determining, by the processor, a maximum slot length; and scheduling, by the processor, service data in symbols such that all service data symbols are within the maximum slot length of symbols corresponding to at least one common service part.

2. The method of claim 1, wherein the plurality of slots comprises one slot for each radio-frequency channel in the time frequency frame.

3. The method of claim 1, wherein a number of slots in one or more RF channels is allocated to a service so that the slots on the one or more RF channels do not overlap with each other in time but are shifted with regard to each other with an amount that depends on a time frequency frame length and the number of allocated RF channels.

4. The method of claim 3, wherein the one or more RF channels are shifted in accordance with:

$$\text{shift} = \frac{\text{TF\_frame\_length}}{N_{RF}},$$

wherein $N_{RF}$ is the number of radio frequency channels in the frame.

5. The method of claim 3, wherein the maximum slot length is dependant on an amount of shifting of the RF channels and on a maximum tuning time for a receiver when changing radio frequency channels.

6. The method of claim 5, wherein the maximum slot length is defined by $$\text{max\_slot\_length} = \text{shif} - T_{tuning},$$

wherein $T_{tuning}$ is the maximum tuning time for a receiver when changing radio frequency channels, and wherein $$\text{shift} = \frac{\text{TF\_frame\_length}}{N_{RF}},$$

wherein $N_{RF}$ is the number of radio frequency channels in the frame.

7. The method of claim 1, wherein the scheduling makes available multiple common service parts through hopping between radio-frequency channels.

8. The method of claim 7, wherein the common service parts comprise program-specific and service information data.

9. The method of claim 1, further comprising:

transmitting the time frequency frame to a receiving device.

10. A computer program product, embodied in a non-transitory computer-readable medium, comprising computer code that, when executed by a processor, causes an apparatus to:

divide a time frequency frame into a plurality of slots, the frame having one or more radio-frequency (RF) channels;

determine a maximum slot length; and schedule service data in symbols such that all service data symbols are within the maximum slot length of symbols corresponding to at least one common service part.

11. An apparatus, comprising:

a processor; and a memory unit communicatively connected to the processor and including:

computer code for dividing a time frequency frame into a plurality of slots, the frame having one or more radio-frequency channels;

computer code for determining a maximum slot length; and computer code for scheduling service data in symbols such that all service data symbols are within the maximum slot length of symbols corresponding to at least one common service part.

12. The apparatus of claim 11, wherein the plurality of slots comprises one slot for each radio-frequency channel in the time frequency frame.

13. The apparatus of claim 11, wherein a number of slots in one or more RF channels is allocated to a service so that the slots on the one or more RF channels do not overlap with each other in time but are shifted with regard to each other with an amount that depends on a time frequency frame length and the number of allocated RF channels.

14. The apparatus of claim 13, wherein the one or more RF channels are shifted in accordance with:

$$\text{shift} = \frac{\text{TF\_frame\_length}}{N_{RF}},$$

wherein $N_{RF}$ is the number of radio frequency channels in the frame.

15. The apparatus of claim 11, wherein the maximum slot length is dependant on an amount of shifting of the RF channels and on a maximum tuning time for a receiver when changing radio frequency channels.

16. The apparatus of claim 15, wherein the maximum slot length is defined by $$\text{max\_slot\_length} = \text{shift} - T_{tuning},$$

wherein $T_{tuning}$ is the maximum tuning time for a receiver when changing radio frequency channels, and wherein $$\text{shift} = \frac{\text{TF\_frame\_length}}{N_{RF}},$$

wherein $N_{RF}$ is the number of radio frequency channels in the frame.

17. The apparatus of claim 11, wherein the scheduling makes available multiple common service parts through hopping between radio-frequency channels.

18. The apparatus of claim 17, wherein the common service parts comprise program-specific and service information data.

19. An apparatus, comprising:

means for dividing a time frequency frame into a plurality of slots, the frame having one or more radio-frequency channels;

means for determining a maximum slot length; and means for scheduling service data in symbols such that all service data symbols are within the maximum slot length of symbols corresponding to at least one common service part.

* * * * *

UNITED STATES PATENT AND TRADEMARK OFFICE

CERTIFICATE OF CORRECTION

PATENT NO. : 8,204,019 B2
APPLICATION NO. : 12/205800
DATED : June 19, 2012
INVENTOR(S) : Heidi Himmanen et al.

It is certified that error appears in the above-identified patent and that said Letters Patent is hereby corrected as shown below:

Column 8, Claim 1, Line 23:
Please delete "frequency flame into" and insert --frequency frame into--

Column 8, Claim 1, Line 24:
Please delete "the flame having" and insert --the frame having--

Signed and Sealed this
Nineteenth Day of February, 2013

Teresa Stanek Rea
*Acting Director of the United States Patent and Trademark Office*